Feb. 7, 1928.

L. WITTENBERG 1,658,320

SPRAYING DEVICE

Filed Sept. 19, 1921

INVENTOR
Lester Wittenberg
BY
Chas. W. Mortimer
ATTORNEY

Patented Feb. 7, 1928.

1,658,320

UNITED STATES PATENT OFFICE.

LESTER WITTENBERG, OF NEW ROCHELLE, NEW YORK, ASSIGNOR TO THE BARRETT COMPANY, A CORPORATION OF NEW JERSEY.

SPRAYING DEVICE.

Application filed September 19, 1921. Serial No. 501,739.

This invention relates to a device for spraying or other purposes where it is desired to suddenly shut off or promptly admit a flow of liquid or semi-liquid material. It is especially useful on vehicles which carry tanks for a supply of liquid materials for sprinkling or spraying streets, roadways, etc. In devices of this sort it is frequently desirable that the supply of liquid to the sprinkler or spray-pipe be promptly and entirely shut off so as to prevent dripping of the material in passing over cross-streets, sidewalks, etc. With the present device this object can be easily accomplished without necessitating the installation of complicated devices that are apt to get out of order and require close attention.

The invention will be understood from the description in connection with the accompanying drawings, in which Fig. 1 is a side view of the device.

Figure 1:
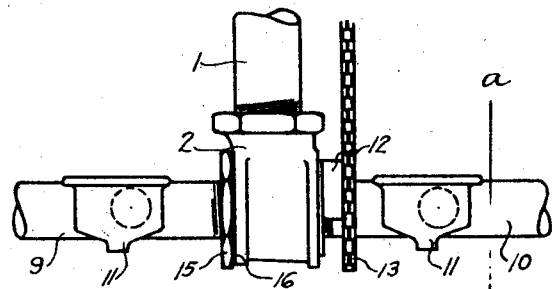

In the drawings reference character 1 designates a pipe which leads from a supply tank (not shown) to the connecting member 2. The connecting member 2 is provided with an inlet opening 3 and with a transverse conically shaped opening 4, into which the inlet 3 extends.

A hollow plug 5, having a conically shaped outer surface to fit in the conical opening 4, is provided with a side inlet 6 to register with the inlet 3 when plug 5 is in the position to permit the material to pass through the device from pipe 1. The interior of the plug 5 is threaded as at 7 and 8 to receive the screw-threaded ends of pipes 9 and 10 respectively, the other ends of which are closed. The pipes 9 and 10 are provided with a series of openings or spray nozzles 11 in rows on the sides thereof. One end of the plug 5 is provided with an extension 12 to which may be attached a convenient means, such as the sprocket 13 to turn the plug 5 in the socket or opening 4. The other end of the plug is provided at 14 with an external screw-thread, onto which is threaded a nut 15; a spring washer 16 is interposed between the nut 15 and a seat 17 on the side of the connecting member 2.

Figures 2, 3:
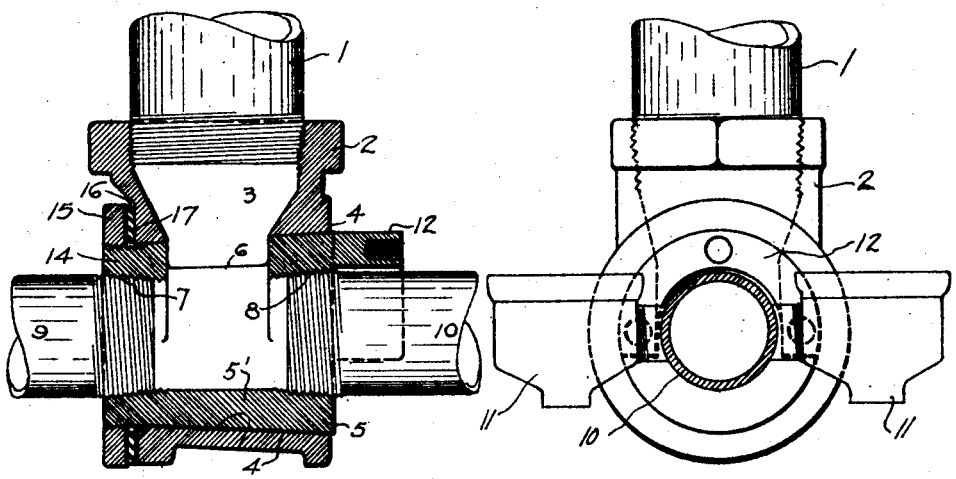
Fig. 2 is a vertical longitudinal section with parts broken away.
Fig. 3 is a section through the line a—a of Fig. 1.

The operation is as follows:

When it is desired to admit material from the supply tank to the outlets or nozzles 11, the plug 5 is turned to the position indicated in Fig. 2, whereupon the material passes through the inlets 3 and 6 to the pipes 9 and 10 and from thence out through the nozzles 11, the spring washer 16 keeping the plug 5 seated snugly in the opening socket 4 and taking up any wear, so that the material does not leak out. When it is desired to shut off the supply of material, the plug 5 is turned through an angle of about 180°, thereby carrying the solid portion 5' of the plug upwardly and around to close the inlet 3, and at the same time carrying the pipes 9 and 10 through an angle of about 180°, thus bringing the outlets 11 to the upper side of the pipes and preventing residual material from dripping.

I claim:—

1. In a device of the class described, a connecting member provided with an inlet and a conical opening, a hollow plug open at both ends and fitted in said conical opening and constituting a valve for said inlet, a horizontal discharge pipe carried by said plug, said pipe being provided with lateral openings therein.

2. In a device of the class described, a connecting member provided with an inlet and a conical opening, a hollow plug open at both ends and fitted in said conical opening and constituting a valve for said inlet, a horizontal discharge pipe carried by said plug, said pipe being provided with lateral openings therein in which are inserted spraying nozzles.

3. In a device of the class described, a connecting member provided with an inlet and a transverse opening, a revoluble hollow member in said opening, said member being open at both ends thereof and constituting a valve for said inlet, nozzles, passages from said inlet through said revoluble member to said nozzles, the discharge ends of said nozzles being at a higher point than said passage in one position of said revoluble member.

4. In a device of the class described, a connecting member provided with an inlet and a conical opening, a hollow plug fitting in said opening and constituting a valve for said inlet, and a spray pipe carried at each end of said plug, said spray pipes being provided with outlets on one side thereof.

5. In a device of the class described, a connecting member provided with an inlet leading to a transverse opening therein, revoluble hollow means in said opening and constituting a valve for said inlet, discharge nozzles connected to said hollow means on both sides thereof, said nozzles having their outlets in a plane above the hollow portion of said means when said means is turned to one position.

In testimony whereof I affix my signature.

LESTER WITTENBERG.